(No Model.)
T. J. BROWN.
HEADER ATTACHMENT.
No. 429,257. Patented June 3, 1890.
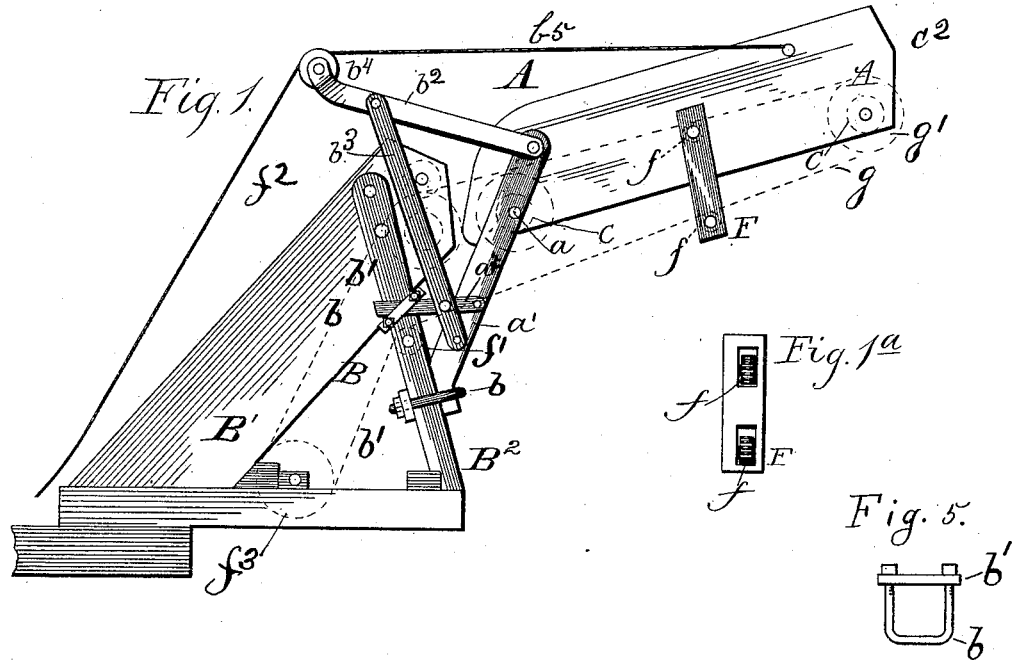
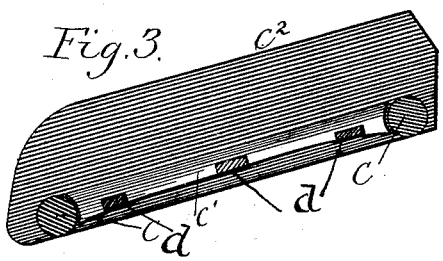
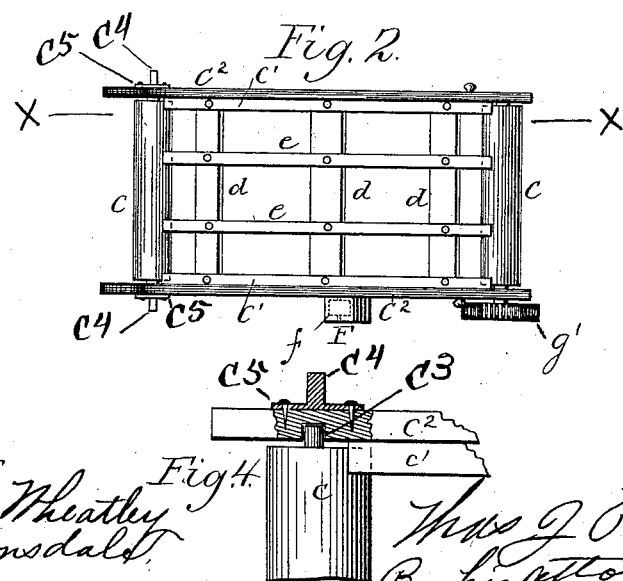
Witnesses
J. Walter Wheatley
M. E. Lansdale
Inventor
Thos. J. Brown
By his attorney
John S. Duffie

UNITED STATES PATENT OFFICE.

THOMAS J. BROWN, OF NEAR ST. PAUL, NEBRASKA, ASSIGNOR OF ONE-HALF TO THOMAS R. WALLACE.

HEADER ATTACHMENT.

SPECIFICATION forming part of Letters Patent No. 429,257, dated June 3, 1890.

Application filed March 1, 1890. Serial No. 342,200. (No model.)

*To all whom it may concern:*

Be it known that I, THOMAS J. BROWN, a native citizen of the United States, residing near St. Paul, in the county of Howard and State of Nebraska, have invented certain new and useful Improvements in Machinery, being an attachment to harvesting-machines to carry the grain from the machine to the wagon; and I do declare the following to be a full, clear, and exact description of the invention, such as will enable others skilled in the art to which it appertains to make and use the same, reference being had to the accompanying drawings, and to the letters of reference marked thereon, which form a part of this specification.

There are times when grain is too short to be bound by a self-binding machine or by the hand in case the machine is a simple harvester; and my invention is an attachment to convert a self-binder or harvester into a header complete within itself, and which may be attached to any self-binder or harvester by means of bolts and nuts or four U-bolts and their binding-plates.

In the accompanying drawings, Figure 1 is an elevation of the rear part of a harvester and binder with the binding attachment removed and my "header attachment" secured in its place. Fig. 2 is a top plan view of the frame-work of the carrier or elevating-chute. Fig. 3 is a sectional view of Fig. 2, cut on the line $x$ $x$. Figs. $1^a$, 4, and 5 are detail views.

It is not deemed necessary to illustrate the parts of the harvester not directly operating in combination with my attachment, which is an extension from the main frame designed to convey the grain to the wagon.

In reference to the drawings, B represents the usual A-frame, composed of the elevator side boards B' and the struts B², and to which is usually attached the binder. Within the said elevator the endless aprons are operated to convey the grain from the platform to the binder.

A represents the header attachment, consisting of the two side boards $c^2$, curtain-rollers $c$, bearers $c'$, (to bear up the edges of the endless curtain,) cross-beams $d$, and longitudinal curtain-bearers $e$ and the sprocket-pulley frame. The said carrier A is pivoted immediately to the right of the A-frame B, so that when the grain passes from the elevator B' it is immediately carried by the endless curtain of my attachment to its extreme end and dropped into a wagon or other receptacle.

My attachment is secured to the A-frame B by means of the upright braces $a'$, the lower ends of which are secured to the struts B² by means of U-bolts $b$, having binding-plates $b'$ and the cross-braces $a^2$, one end of each of which is bolted to the upright braces $a'$ and the other secured to the struts B² by means of U-shaped bolts and nuts and binding-plates $b'$. To the upper ends of said uprights $a'$ are bolted pulley-bearers $b^2$, which are braced by upright braces $b^3$, the lower ends of which are bolted to the braces $a'$ and braces $a^2$, the upper ends to the pulley-bearers $b^2$. Between the upper ends of said pulley-bearers is pivoted grooved pulley $b^4$. To the outer end of said header attachment is secured a cord $b^5$, which passes over said pulley $b^4$ and down to within easy reach of the driver, where it may be secured, so that said end of said elevator may be lowered or elevated at will.

A sprocket-chain (represented by the dotted line $g$) passes around a sprocket-wheel $g'$, rigidly secured to the journal of the roller $c$ in the outer end of the elevator, through the guide F, and over the sprocket-pulleys $f$, over a small sprocket-wheel $f'$, journaled on the strut B², and a sprocket-wheel $f^2$, journaled to the upper end of the A-frame B, and under the sprocket-wheel $f^3$, journaled to the base of said frame. The operation is obvious and needs no description.

To the inner faces of the said side pieces $c^2$ are secured longitudinal bars $c'$, which reach from one curtain-roller to the other, their ends being concaved, so as to fit neatly nearly against the periphery of the side rollers, the upper edge of said beam being straight and on a line with the upper part of said rollers, so as to bear up the edges of the endless curtain. Three or more cross-pieces $d$ are mortised into said longitudinal side piece, which serve to hold the side board $c^2$ in place. On the top of said cross-pieces $d$ are secured two or more longitudinal pieces, their upper surface being on an exact line with the upper surface of said side pieces $c'$ and the upper surface of the said rollers $c$ to support the middle of the said endless curtain. The said elevator A is pivoted to the uprights $a'$ at the socket $a$ on a direct center line with the journal of the inner roller $c$, so that the outer end of said elevator when raised or lowered ever so much the position of said roller in relation to the upper roller of the A-frame will not be changed; but it is not pivoted on extended ends of the pivot of said roller. The journal of said roller (see Fig. 4) is journaled in an independent socket, which passes only about half-way through the side pieces $c^2$, and to the outside of said side pieces $c^2$ and immediately on a line with the journal of said roller is secured another journal $c^4$, having the base-plate $c^5$. This arrangement saves the friction that would follow if the said elevator were pivoted by means of the extended ends of the journal in the roller $c$, and thereby allows the roller to be operated freely by the said sprocket-chain $g$.

In operation it will be understood that the cut material is delivered by the platform-carrier of the harvester to the elevator thereof, and is raised and discharged by the latter to the binding attachment or to the header attachment, as the case may be.

Having described my invention, what I claim as new, and desire to secure by Letters Patent, is—

The header attachment A, consisting of the upright braces $a'$, cross-braces $a^2$, pulley-supports $b^2$ $b^3$, and pulley $b^4$, side pieces $c^2$, having the inside beams $c'$ reaching to each roller, their upper edges parallel with the upper surface of said rollers, cross-pieces $d$, holding said side pieces in place, longitudinal bars $e$, their upper surface on a line with the upper surface of the side pieces $c'$ and adapted to support the endless curtain, outer roller $c$, journaled in the outer end of said side pieces $c^2$ and bearing on one end a sprocket-wheel $g'$, an inner roller $c$, journaled in the inner ends of said side pieces, journal $c^4$, secured to the outer faces of said side pieces $c^2$ and on an exact line with the journal $c^3$, said rollers adapted to carry an endless curtain, and sprocket frame B, secured to the outer face of the rear side piece $c^2$ and bearing the sprocket-wheels $f$, substantially as shown and described.

In testimony whereof I affix my signature in presence of two witnesses.

THOMAS J. BROWN.

Witnesses:
T. R. WALLACE,
ANNIE BROWN.